Aug. 18, 1936.   M. L. GOLDBERT ET AL   2,051,637
ELECTRICAL HEATING DEVICE
Filed Dec. 7, 1934
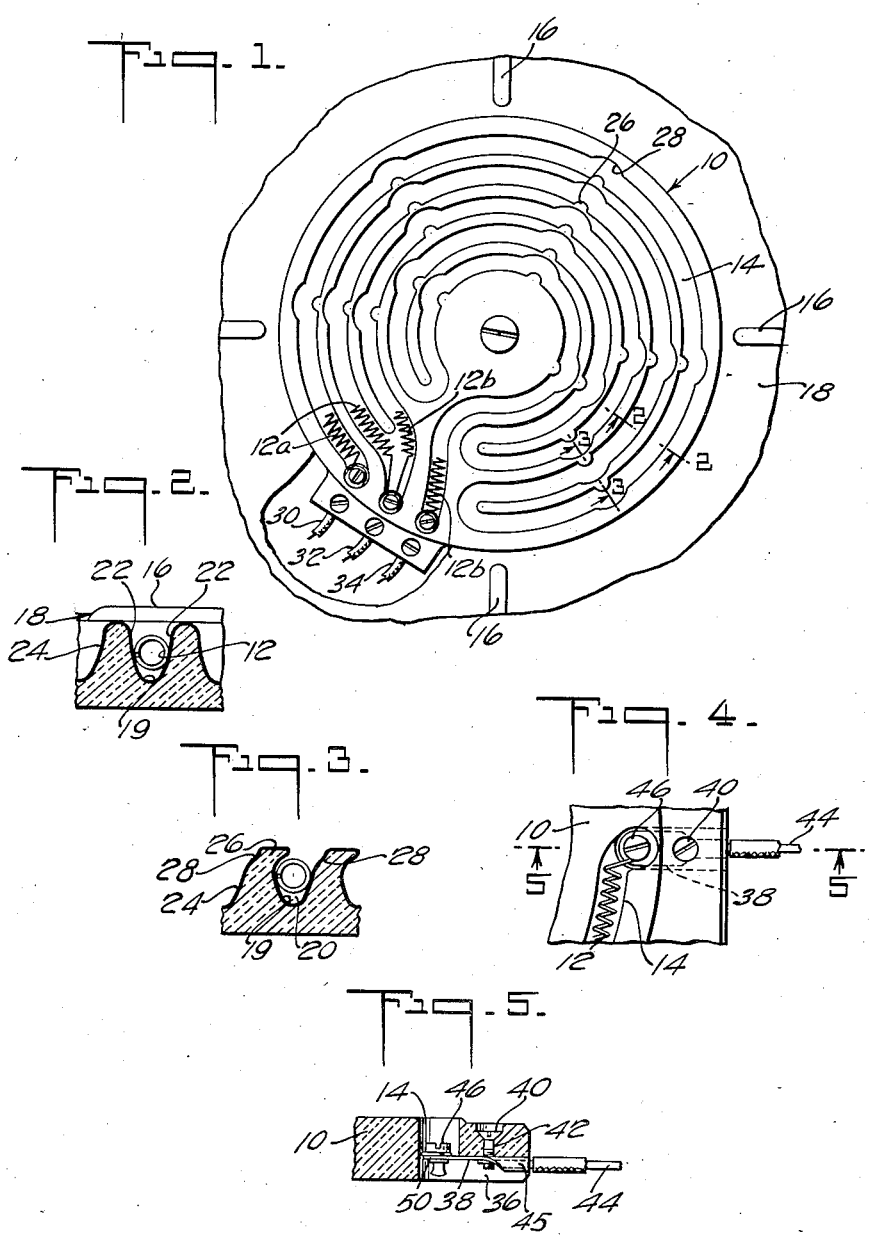
INVENTORS
Max L. Goldbert
and Roy T. Watts.
BY
Dyke and Schaines
ATTORNEYS

UNITED STATES PATENT OFFICE 2,051,637

ELECTRICAL HEATING DEVICE

Max L. Goldbert, New York, N. Y., and Roy T. Watts, Miami Beach, Fla., assignors to Electric Trading Corporation, New York, N. Y., a corporation of New York Application December 7, 1934, Serial No. 756,407

3 Claims. (Cl. 219—37)

Our invention relates to an electrical heating device and particularly to a heating plate having a base of refractory material, and having grooves for receiving heating elements in coil formation, thereby providing a heating plate which can be used alone or as an element of electric stoves and electric heating devices generally.

Among the objects of the invention are the provision of an electrical heating plate comprising a base formed of efficient heat ray reflecting material, such as shining glazed porcelain, extending over the surfaces thereof, and particularly having its groove walls of such mirror-like reflecting capacity.

Another object consists in the formation of the heating element receiving grooves in the base member of substantially parabolic curved section, with the widest portions at the entrance to the groove, whereby the curve formation of groove walls is such as to secure a maximum reflection of heat rays up against the object to be heated which is supported thereabove.

Another object of the invention consists in the provision with grooves for receiving heating elements, which grooves are widest open at the mouth portions thereof, of means for holding the heating elements down within said grooves, said means preferably comprising spaced ears projecting over the groove opening at one side thereof, together with recessed parts at the sides of the grooves opposite such ears, whereby the heating element can be inserted and hooked and held under such projecting ears.

Another object of the invention consists in the provision of the plate base member with a groove which is narrowest near the bottom thereof and with such narrower portion of less width than the width of the heating element coil, whereby the coil is supported above the base of the groove, and air circulation obtained through the open coil which assists in delivering heat by convection to the object being heated.

A further object of the invention consists in the provision of the heating element base with grooves on its lower face which intersect the heating element receiving grooves on its upper face, and the attachment of a terminal lying within such lower groove to the heating element base, and also the attachment of the coiled heating element to such terminal, both of such attachments comprising screw means accessible from the same side of the plate, whereby same may be conveniently assembled and both connections are accessible for tightening from the same side of the base member.

Other objects of our invention will appear in connection with the following description of an embodiment of the invention.

In the accompanying drawing showing an embodiment of the invention,

Fig. 1 is a plan view of an electrical heating plate embodying the invention;

Figs. 2 and 3 are sections on the line 2—2 and 3—3 of Fig. 1;

Fig. 4 is a detail view of a part of the heating plate of Fig. 1 on an enlarged scale, and Fig. 5 is a section on line 5—5 of Fig. 4.

Reference character 10 designates the grooved base of porcelain or other refractory which serves as a combined support and insulator for the heating elements 12 received in the grooves 14, and over which is placed the culinary receptacle or other object to be heated, same being preferably supported a short distance above the surface of the plate 10, as upon raised portions 16, 16, of the stove top 18, or other structure with which the plate 10 may be associated.

We find that the greatest efficiency in securing delivery of heat to the object being heated is obtained by avoiding, so far as possible, storage of heat in the refractory base plate 10, and by directing and/or reflecting the heat rays to the greatest possible extent against the cooking or other receptacle to be heated, together with securing the maximum available heat delivery by convection of heated air.

In order to secure circulation of air and efficient heat delivery by convection, we make the grooves 14 in the plate 10 narrower near the bottom than the diameter of the heating element coils 12, as indicated at 19, thereby supporting the elements 12 above the groove bottoms in focused relation to the parabolic curved side wall portions of the groove, and providing an open space 20 within the grooves 14 and beneath the open coils of the heating elements 12. This gives an opportunity for air circulation and for the air heated by the coil heating elements 12, rising and delivering its heat to the supernatant object being heated.

In order to secure the greatest reflection from the groove walls so as to throw the reflected heat rays up against the object being heated, we make the groove walls above the narrow lower parts 19 to embody or conform to a parabolic curve, as indicated at 22, 22.

The plate 10 is preferably made of porcelain, and by providing the surfaces of the porcelain plate 10, including the surfaces of the groove walls, with a shining mirror-like glaze 24, the groove walls act as parabolic mirrors to reflect the heat rays up against the receptacle being heated.

We have found that a shining, black, glazed porcelain gives the most effective heat reflection from the parabolic mirror-like walls of the grooves, and it is an important feature of the invention that the surface of the heating plate and particularly the reflecting surfaces of the groove walls therein be made of shining, black, glazed porcelain for this reason.

To hold the heating element coil 12 in place, projecting ears 26 are preferably provided to extend over the groove at intervals, preferably along one side of the groove as shown, the groove walls being cut back at the other side at the region opposite the ears, as indicated at 28, to permit the insertion of the coils 12 which, after insertion, catch under and are held down by the ears 26.

With this arrangement, the grooves 14 can be widest at their open mouths to permit free passage of heat rays, and at the same time the heating element coils are held down in their proper place.

The grooves 14 may follow various paths according to the heating effects to be secured. In the form shown, three terminals 30, 32 and 34 are provided, and from one of the outside terminals 30, the coiled heating element 12a goes in grooves around near the outside of the plate and back to the intermediate terminal 32, and from the other outside terminal 34, the heating element 12b goes around interiorly several times to make up a heating element of any desired length, and thence leads to the common intermediate terminal 32. In this way, variations in heating effect can be secured by routing the current through either of the heating elements 12a or 12b or through both.

It is of advantage to have terminal members so arranged that the screw heads thereof are exposed on the upper side of the plate, whereby ready access can be had to same for keeping the connections tight. With the grooves 14 for receiving the heating coils 12 formed in the upper surface of plate 10, we preferably provide grooves 36 in the lower part of the plate for receiving the terminal or connecting members 38, and attach same to the plate by means of screws 40 which extend downwardly through holes 42 in plate 10, so that they may connect the terminal 38 to the plate 10 by drawing same upward against the plate 10 from below. The lead wire 44 is clamped in the rolled-in collar-like part 45 of the terminal member 38. By having the under groove 36 intersect the element receiving upper groove 14, and the head of element fastening screw 46 in the inner end 50 of terminal 38 projecting into the upper groove 12, a very secure and readily accessible connection of the lead wires and heating coils together, and of the connecting terminal to the carrying plate is secured, and the entire connecting arrangement is very simple and inexpensive.

It is to be understood that the illustrated embodiment is for the purpose of affording an understanding of the invention, and modifications and changes coming within the scope of our claims are comprised within our invention.

We claim:

1. A refractory base for an electrical heating plate, said base provided with intersecting grooves on its opposite faces, heating elements disposed in the grooves on one face and terminal members in the grooves in the other face, and projecting into the grooves in the first-named face, means accessible from the side of the base containing the heating element grooves for connecting the terminal members to the base, and means also accessible from the same face of the base for connecting the heating elements to the inner ends of the terminal members.

2. A base member of insulating material having grooves on its upper face, electric heating elements disposed in said grooves, terminal receiving grooves in the lower face of the base member, and terminal members in said last named grooves and screw held upwardly to said base member, the upper and lower grooves intersecting and the terminal members extending at their inner ends from the lower into the upper grooves, and screw means for holding said electrical heating elements down on the top of the terminal members near the inner ends of the latter.

3. In an electric heating device, a vertically grooved plate of porcelain or the like, having all its surfaces, including the groove wall surfaces, covered by a high heat-ray reflecting glaze, the groove walls being widest and appreciably flaring outwardly at their open sides and of substantially parabolic curved section and narrowest at the bottom, and open circularly coiled resistance wire electrical heating elements of greater diameter than the width of the groove near the bottom, said coil being disposed within the grooves and spaced from the bottom thereof whereby a substantial portion of the groove is open below the wire coils to permit free air circulation and wide heat delivery by convection the coil beginning and ending near the periphery of the plate.

MAX L. GOLDBERT.
ROY T. WATTS.